US010769423B2

(12) United States Patent
Liu et al.

(10) Patent No.: US 10,769,423 B2
(45) Date of Patent: Sep. 8, 2020

(54) METHOD, SYSTEM AND TERMINAL FOR IDENTITY AUTHENTICATION, AND COMPUTER READABLE STORAGE MEDIUM

(71) Applicant: Baidu Online Network Technology (Beijing) Co., Ltd, Beijing (CN)

(72) Inventors: Fanping Liu, Beijing (CN); Weiqing He, Beijing (CN); Wenbin Xie, Beijing (CN); Xiangli Chen, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 71 days.

(21) Appl. No.: 16/152,968

(22) Filed: Oct. 5, 2018

(65) Prior Publication Data
US 2019/0278985 A1 Sep. 12, 2019

(30) Foreign Application Priority Data
Mar. 9, 2018 (CN) .......................... 2018 1 0193226

(51) Int. Cl.
G06K 9/00 (2006.01)
G06F 21/32 (2013.01)
G06K 9/62 (2006.01)

(52) U.S. Cl.
CPC ......... G06K 9/00369 (2013.01); G06F 21/32 (2013.01); G06K 9/00892 (2013.01); G06K 9/6256 (2013.01)

(58) Field of Classification Search
None
See application file for complete search history.

(56) References Cited

U.S. PATENT DOCUMENTS

2010/0172567 A1* 7/2010 Prokoski .............. A61B 5/0064
382/132
2016/0063720 A1* 3/2016 Han ..................... G06K 9/6269
382/131
(Continued)

FOREIGN PATENT DOCUMENTS

CN 105184280 A 12/2015
CN 105389549 A 3/2016
(Continued)

OTHER PUBLICATIONS

Araujo, R. M., Graña, G., & Andersson, V. (Mar. 2013). Towards skeleton biometric identification using the microsoft kinect sensor. In Proceedings of the 28th Annual ACM Symposium on Applied Computing (pp. 21-26). (Year: 2013).*
(Continued)

*Primary Examiner* — David Perlman
(74) *Attorney, Agent, or Firm* — Akerman LLP

(57) ABSTRACT

A method, a system and a terminal for identity authentication, and a computer readable storage medium are provided. The method includes: acquiring a human body image of a person to be authenticated, and determining from the human body image a plurality of skeleton key points of the person to be authenticated; converting the skeleton key points into feature data, and combining the feature data to form physique feature information characterizing the person to be authenticated; processing the physique feature information using a physique feature model by inputting the physique feature information into the physique feature model, to obtain a processing result; and recognizing the identity of the person to be authenticated based on the processing result of the physique feature model.

11 Claims, 2 Drawing Sheets

(56) References Cited

U.S. PATENT DOCUMENTS

2018/0061054 A1* 3/2018 Abraham ................ A61B 6/14
2019/0139297 A1* 5/2019 Chen ....................... G06T 17/20

FOREIGN PATENT DOCUMENTS

| CN | 105760832 A | 7/2016 |
| CN | 106327495 A | 1/2017 |
| CN | 106778474 A | 5/2017 |
| CN | 106780864 A | 5/2017 |
| CN | 106815566 A | 6/2017 |
| CN | 107358207 A | 11/2017 |
| CN | 107609459 A | 1/2018 |
| CN | 107767419 A | 3/2018 |
| WO | 00/16247 A1 | 3/2000 |

OTHER PUBLICATIONS

Office Action issued in connection with corresponding Chinese Patent Application No. 201810193226.6.

Search Report issued in connection with corresponding Chinese Patent Application No. 201810193226.6.

Office Action dated Nov. 29, 2018 in connection with corresponding Chinese Patent Application No. 201810193226.6.

Search Report dated Nov. 26, 2018 in connection with corresponding Chinese Patent Application No. 201810193226.6.

Notification of the Fourth Office Action dated Jun. 18, 2020 in connection with corresponding Chinese Patent Application No. 2018101932266.

Search Report dated Jun. 12, 2020 in connection with corresponding Chinese Patent Application No. 2018101932266.

\* cited by examiner

METHOD, SYSTEM AND TERMINAL FOR IDENTITY AUTHENTICATION, AND COMPUTER READABLE STORAGE MEDIUM

CROSS-REFERENCE TO RELATED APPLICATIONS

This application claims priority to Chinese Patent Application No. 201810193226.6, filed on Mar. 9, 2018, which is hereby incorporated by reference in its entirety.

FIELD OF THE DISCLOSURE

The present disclosure relates to the technical field of image processing and recognition, and in particular, to a method, a system and a terminal for identity authentication, and a computer readable storage medium.

BACKGROUND OF THE DISCLOSURE

In the existing technology, when a person passes through a device such as a gate or an entrance guard, identity authentication needs to be performed on the person. However, a user's initiative participation is needed to achieve identity authentication in the existing manners of identity authentication. For example, both fingerprint authentication and iris authentication need close contact with the user. Although face authentication is a non-contact manner, close-range acquisition needs to be performed on the user. On the other hand, the existing manners of identity authentication also have certain requirements on the angle, light, and definition of the acquired image of a body part of the user, and has strong perceptibility and a relatively strict authentication condition.

The above information disclosed in the background is only for enhancing an understanding of the background of the present disclosure. Therefore, it may contain information that does not constitute the existing technology known to those skilled in the art.

SUMMARY OF THE DISCLOSURE

A method, a system and a terminal for identity authentication, and a computer readable storage medium are provided according to embodiments of the present disclosure, so as to solve at least the above technical problems in the existing technology.

In a first aspect, a method for identity authentication is provided according to an embodiment of the present disclosure. The method includes:

acquiring a human body image of a person to be authenticated, and determining from the human body image a plurality of skeleton key points of the person to be authenticated;

converting the skeleton key points into feature data, and combining the feature data to form physique feature information characterizing the person to be authenticated;

processing the physique feature information using a physique feature model by inputting the physique feature information into the physique feature model, to obtain a processing result; and recognizing the identity of the person to be authenticated based on the processing result of the physique feature model.

In combination with the first aspect, in a first embodiment of the first aspect of the present disclosure, said determining from the human body image a plurality of skeleton key points of the person to be authenticated includes:

extracting the plurality of skeleton key points of the person to be authenticated from the human body image of the person to be authenticated, based on a skeleton recognition model constructed by a convolutional neural network.

In combination with the first embodiment of the first aspect, in a second embodiment of the first aspect of the present disclosure, the method further includes constructing the skeleton recognition model, wherein the constructing the skeleton recognition model includes:

labeling sample skeleton key points of a plurality of sample human body images, and constructing a basic model based on the sample skeleton key points of the plurality of sample human body images; and training the basic model with a plurality of training samples to generate the skeleton recognition model for recognizing the skeleton key points.

In combination with the first aspect, in a third embodiment of the first aspect of the present disclosure, before converting the skeleton key points into feature data, the method further includes:

converting the skeleton key points determined in a non-standard posture of the person to be authenticated, into standard skeleton key points in a standard posture of the person to be authenticated.

In combination with the first aspect, in a fourth embodiment of the first aspect of the present disclosure, said converting the skeleton key points into feature data includes:

defining a plurality of feature points based on the human body image; and for each of feature points, calculating feature values based on the feature point and the respective skeleton key points, and summing up the feature values to obtain one of the feature data corresponding to the feature point.

In combination with the first aspect, in a fifth embodiment of the first aspect of the present disclosure, the physique feature model includes a first physique feature model and/or a second physique feature model. The first physique feature model is configured to determine a probability that the person to be authenticated is a suspected person, and the second physique feature model is configured to determine a probability that the person to be authenticated is one of multiple persons.

In combination with the first aspect, in a sixth embodiment of the first aspect of the present disclosure, the method further includes constructing the physique feature model, wherein the constructing the physique feature model comprises:

converting sample skeleton key points of a sample human body image into sample feature data; and constructing the physique feature model based on a fully connected network structure or a residual network structure in combination with the sample feature data.

In combination with the sixth embodiment of the first aspect, in a seventh embodiment of the first aspect of the present disclosure, the sample skeleton key points are standard sample skeleton key points under a standard posture.

In a second aspect, a system for identity authentication is provided according to an embodiment of the present disclosure. The system includes:

a human body recognition module configured to acquire a human body image of a person to be authenticated, and determine from the human body image a plurality of skeleton key points of the person to be authenticated;

a conversion module configured to convert the skeleton key points into feature data, and combine the feature data to form physique feature information characterizing the person to be authenticated;

a processing module configured to process the physique feature information using a physique feature model by inputting the physique feature information into the physique feature model, to obtain a processing result; and an authentication module configured to recognize the identity of the person to be authenticated based on the processing result of the physique feature model.

In a possible design, the human body recognition module includes:

an extraction sub-module configured to extract the plurality of skeleton key points of the person to be authenticated from the human body image of the person to be authenticated, based on a skeleton recognition model constructed by a convolutional neural network.

In a possible design, the conversion module includes:

a correction sub-module configured to convert the skeleton key points determined in a non-standard posture of the person to be authenticated, into the standard skeleton key points in a standard posture of the person to be authenticated.

In a possible design, the conversion module includes:

a feature point sub-module configured to define a plurality of feature points based on the human body image; and a calculation sub-module configured to, for each of feature points, calculate feature values based on the feature point and the respective skeleton key points, and summing up the feature values to obtain one of the feature data corresponding to the feature point.

In a third aspect, a terminal for identity authentication is provided according to an embodiment of the present disclosure. The terminal includes:

one or more processors;

a storage device configured to store one or more programs; and a camera configured to acquire an image, wherein the one or more programs, when executed by the one or more processors, enable the one or more processors to implement the method included in the first aspect.

In a fourth aspect, a computer readable storage medium, in which a computer program is stored, is provided according to an embodiment of the present disclosure, wherein the computer program, when executed by a processor, implements the method included in the first aspect.

One of the above technical solutions has the following advantages or advantageous effects: 1. in the present disclosure, a non-contact and non-perceptual physique feature recognition method is adopted so that identity authentication at an intermediate or long distance is achieved, thereby reducing user's participation and realizing the identity authentication more efficiently; 2. with the present disclosure, an accurate identity authentication can still be achieved without depending on a high-definition image acquisition apparatus and with less dependence on the environment and the person himself/herself.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION OF THE EMBODIMENT(S) OF THE DISCLOSURE

Hereinafter, only some exemplary embodiments are simply described. As can be recognized by those skilled in the art, the described embodiments may be modified in various ways without departing from the spirit or scope of the present disclosure. Accordingly, the drawings and the description should be considered as illustrative in nature instead of being restrictive.

First Embodiment

Figure 1:
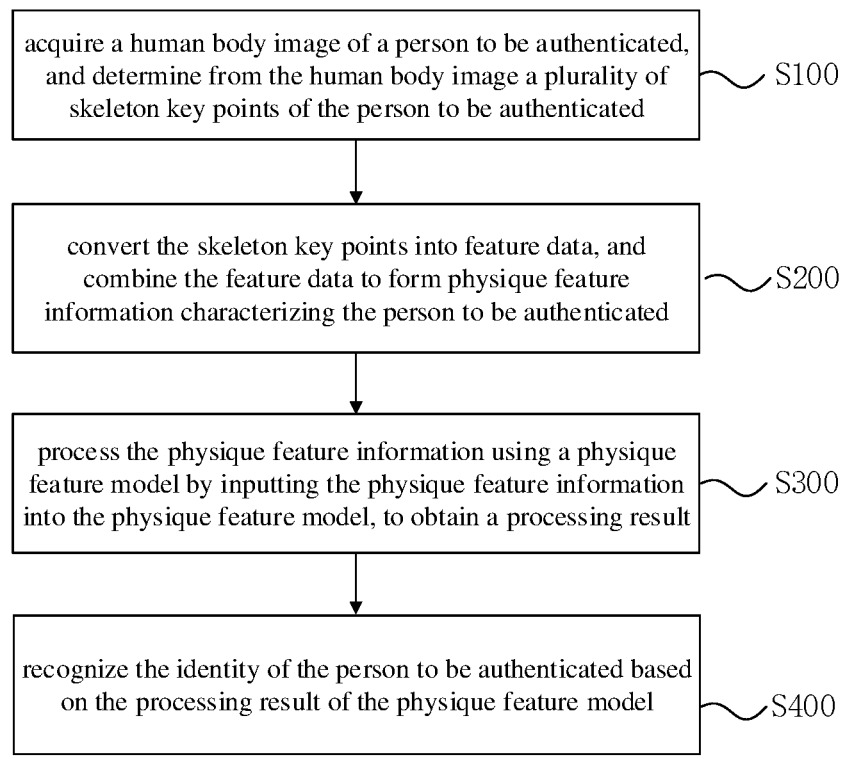
FIG. 1 is a schematic flowchart of a method for identity authentication according to an embodiment of the present disclosure.

A method for identity authentication is provided according to this embodiment of the present disclosure. As shown in FIG. 1, the method mainly includes steps S100 to S400.

In step S100, a human body image of a person to be authenticated is acquired, and a plurality of skeleton key points of the person to be authenticated are determined from the human body image.

The human body image of the person to be authenticated may be acquired via a camera or another existing image acquisition device. Since the acquisition of the human body image of the person is less dependent on the environment and the person himself/herself, the human body image may be acquired by an image acquisition device with a low resolution.

In step S200, the skeleton key points are converted into feature data, and the feature data are combined to form physique feature information characterizing the person to be authenticated.

In step S300, the physique feature information is processed using a physique feature model by inputting the physique feature information into the physique feature model, to obtain a processing result.

In step S400, the identity of the person to be authenticated is recognized based on the processing result of the physique feature model.

In a case where a score of the processing result of the physique feature model is equal to or below a score threshold, it is determined that the person to be authenticated is not a person with a legitimate identity, and the person to be authenticated cannot pass through a device such as a gate or an entrance guard. In a case where the score of the processing result of the physique feature model exceeds the score threshold, a suspected person with a higher score is determined as a person to be determined, that is, the person to be authenticated is determined as a person with a legitimate identity, and the person to be authenticated can pass through the device such as the gate or the entrance guard.

On the basis of the first embodiment, after being acquired, the human body image may be pre-processed to improve the accuracy of a subsequent extraction of the skeleton key points, and subsequent operations are performed after the quality of the human body image is improved.

The acquired human body image is preprocessed using any image preprocessing method in the existing technology such as light adjustment, noise reduction processing and contrast adjustment. It should be noted that, instead of being limited to the preprocessing method illustrated in the embodiment, a specific image preprocessing method may be any method in the existing technology, as long as the acquired image can be optimized.

On the basis of the first embodiment, determining from the human body image a plurality of skeleton key points of the person to be authenticated includes: extracting the plurality of skeleton key points of the person to be authenticated from the human body image of the person to be authenticated, based on a skeleton recognition model constructed by a convolutional neural network.

It should be noted that, specific skeleton key points can be selected as required, as long as the selected skeleton key points can represent body parts of the person to be authenticated in a physique posture. The specific number of the extracted skeleton key points can also be selected as required. The more the number of the selected skeleton key points is, the more accurately physique features of the person to be authenticated can be recognized.

In an embodiment, for example, the skeleton key points may include position information of some or all of the following: right ankle, right knee, right buttock, left hip, left knee, left ankle, pelvis, chest, upper neck, top of head, right wrist, right elbow, right shoulder, left shoulder, left elbow and left wrist. It should be noted that, the skeleton key points are not limited to the above example, and can be adjusted as required.

On the basis of the first embodiment, the method further includes a step of constructing a skeleton recognition model.

Specifically, sample skeleton key points of a plurality of sample human body images are labeled, and a basic model is constructed based on the sample skeleton key points of the plurality of sample human body images. The sample skeleton key points of the sample human body images may be labeled manually. The basic model is integratedly constructed based on the labeled data of the sample human body images, for recognizing the skeleton key points of the acquired human body image.

The basic model is trained with a plurality of training samples to generate the skeleton recognition model for recognizing the skeleton key points. Since the initial basic model is constructed based on a few sample human body images, the capability of the basic model to recognize the skeleton key points is not necessarily adapted to all human body images. Therefore, the basic model needs to be repeatedly trained with more training samples and is updated until the basic model converges. That is, it is considered that the basic model can serve as the skeleton recognition model if the capability to recognize the skeleton key points of different human body images reaches a standard.

In a preferred embodiment, the skeleton recognition model is constructed based on a deep convolutional neural network.

Figure 2:
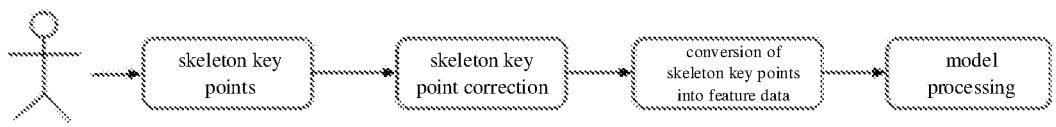
FIG. 2 is a schematic flowchart showing a conversion of skeleton key points into physique feature information according to an embodiment of the present disclosure.

On the basis of the first embodiment, as shown in FIG. 2, before converting the skeleton key points into feature data, the method further includes:

converting the skeleton key points determined in a non-standard posture of the person to be authenticated, into the standard skeleton key points in a standard posture of the person to be authenticated. The correction can be implemented with an affine transformation method. Then, the standard skeleton key points are converted into feature data.

Figure 3:
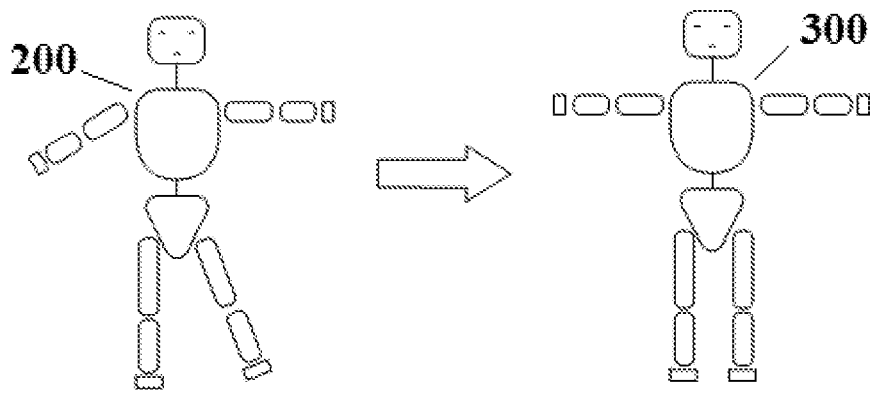
FIG. 3 is a schematic diagram showing a correction from a non-standard posture to a standard posture according to an embodiment of the present disclosure.

It should be noted that, the human body image may be acquired when the person to be authenticated is in a static state or in a walking state. Therefore, the acquired human body image is a human body image when the person to be authenticated is in a dynamic posture as a non-standard posture, instead of a human body image under a standard standing posture. In order to ensure the accuracy of extraction of the skeleton key points and not to affect the subsequent acquisition of the physique feature information, a human body image under a non-standard posture 200 needs to be corrected into a human body image under a standard posture 300 (as shown in FIG. 3), thereby achieving extraction of the skeleton key points of the human body image under the standard posture.

On the basis of the first embodiment, converting the skeleton key points into feature data includes:

defining a plurality of feature points based on the human body image;

and for each of feature points, calculating feature values based on the feature point and the respective skeleton key points, and summing up the feature values to obtain one of the feature data corresponding to the feature point.

It should be noted that, the feature points can be understood as arbitrary points on a human body, such as various tangible or intangible feature points including the head of the human body, the center of gravity of the human body and so on.

Any one of feature data can be understood as a sum of distances between any one of the feature points and all the skeleton key points. For example, a sum of distances from all the skeleton key points to the center of gravity of the human body is taken as one of the feature data, or, a sum of angles from all the skeleton key points to the center of gravity of the human body is taken as one of the feature data.

Each of the feature points has a function. The function can be understood as an operation for calculating an absolute value of relevant data between the feature point and any one of the skeleton key points. Each of the feature data corresponds to a function. It is required to perform operations on all the skeleton key points according to the same function, and sum up the results of the operations performed on all the skeleton key points according to the same function, to obtain one of the feature data.

In a specific embodiment, in a case where n skeleton key points p are converted into m feature data V, m functions f (x) are required, and each of the functions f (x) corresponds to one of the feature data. In calculating any one of the feature data $V_j$, operations are first performed on all the skeleton key points p according to the function f (x), and then, the results of the operations performed on the n skeleton key points p are summed up to obtain a feature datum $V_j$. Specifically:

$$V_j = \Sigma_{i=0}^{n} f_j(p_i), j \in [1,m];$$

where V represents a feature datum, j represents a serial number of the feature datum, p represents a skeleton key point, n represents the number of the skeleton key points, i represents a serial number of the skeleton key point, and m represents the number of the feature data.

It should be noted that, the number of the feature points is greater than the number of the skeleton key points. For example, if 16 skeleton key points are extracted, 512 feature points may be converted from the 16 skeleton key points. The specific number of the skeletal key points and the specific number of the feature points are adjusted based on requirements and authentication accuracy, and are not limited to those defined in this embodiment. The above parameters are merely for explanation.

On the basis of the first embodiment, the method further includes the step of constructing a physique feature model.

Specifically, the sample skeleton key points of the sample human body image are converted into sample feature data, and the physique feature model is constructed based on a fully connected network structure or a residual network structure in combination with the sample feature data, wherein the sample skeleton key points are standard sample skeleton key points under the standard posture.

On the basis of the first embodiment, the physique feature model includes a first physique feature model and/or a second physique feature model.

A fully connected network structure is taken as a basic model structure for the first physique feature model, and a probability that the person to be authenticated is a suspected person is determined based on the first physique feature model in combination with the feature data. Therefore, the first physique feature model may also be referred to as a 1:1 physique feature model, that is, a one-to-one separate comparison and confirmation is made between the person to be authenticated and the suspected person. The 1:1 physique feature model is mainly used for a more secure and reliable identity authentication, and can effectively resist living body attacks in face recognition. The physique authentication can block an attack to a face recognition system which is performed by an attacker with a photo or a video.

A residual network structure is taken as a basic model structure for the second physique feature model, and a probability that the person to be authenticated is a certain one of multiple persons is determined based on the second physique feature model in combination with the feature data. Therefore, the second physique feature model may also be referred to as a 1:N physique feature model, where N represents a recognition scale, i.e., the number of persons. For example, if N is 100, it represents that the person to be authenticated is recognized from 100 persons. The 1:N physique feature model is mainly used for more effective identity authentication. With the 1:N physique feature model, in a case of change of the face itself (makeup, hair style change) or poor shooting environment (environmental illumination, camera resolution), the accuracy of identity authentication can be improved and the misrecognition rate can be reduced.

On the basis of the first embodiment, standard physique feature information of a person can be pre-stored by active uploading or passive acquisition.

In the active uploading, a full-body image of the person is uploaded to a system for identity authentication, and standard physique feature information is determined based on the skeleton recognition model and the physique feature model. The person can directly pass the authentication when passing through the system for identity authentication again.

In the passive acquisition, when the person passes through a system for identity authentication (i.e., a device such as a gate or an entrance guard) for the first time, human body images of the person within a walking period are acquired by an image acquisition device, and standard physique feature information is determined based on the skeleton recognition model and the physique feature model. The person can directly pass the authentication when passing through the system for identity authentication again.

Second Embodiment

Figure 4:
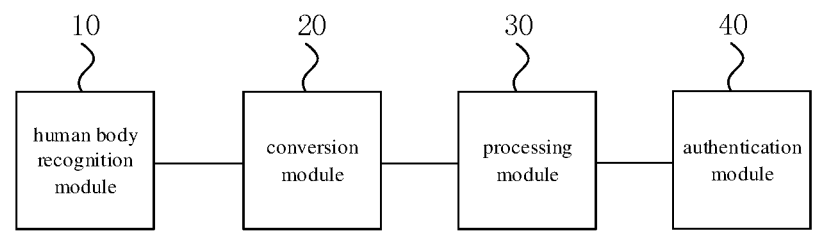
FIG. 4 is a schematic structural diagram of a system for identity authentication according to an embodiment of the present disclosure.

A system for identity recognition is provided according to an embodiment of the present disclosure. As shown in FIG. 4, the system includes a human body recognition module 10, a conversion module 20, a processing module 30 and an authentication module 40.

The human body recognition module 10 is configured to acquire a human body image of a person to be authenticated, and determine from the human body image a plurality of skeleton key points of the person to be authenticated.

The conversion module 20 is configured to convert the skeleton key points into feature data, and combine the feature data to form physique feature information characterizing the person to be authenticated.

The processing module 30 is configured to process the physique feature information using a physique feature model by inputting the physique feature information into the physique feature model, to obtain a processing result.

The authentication module 40 is configured to recognize the identity of the person to be authenticated based on the processing result of the physique feature model.

In a possible design, the human body recognition module 10 includes:

an extraction sub-module configured to extract the plurality of skeleton key points of the person to be authenticated from the human body image of the person to be authenticated, based on a skeleton recognition model constructed by a convolutional neural network.

In a possible design, the conversion module 20 includes:

a correction sub-module configured to convert the skeleton key points determined in a non-standard posture of the person to be authenticated, into the standard skeleton key points in a standard posture of the person to be authenticated.

In a possible design, the conversion module 20 further includes:

a feature point sub-module configured to define a plurality of feature points based on the human body image; and a calculation sub-module configured to, for each of feature points, calculate feature values based on the feature point and the respective skeleton key points, and summing up the feature values to obtain one of the feature data corresponding to the feature point.

Third Embodiment

A terminal for identity authentication is provided according to an embodiment of the present disclosure, the terminal including:

a memory 101 and a processor 102, wherein a computer program that can run on the processor 102 is stored in the memory 101, the processor 102 executes the computer program, to implement the method for identity authentication in the above embodiment, and the number of each of the memory 101 and the processor 102 may be one or more;

a camera 103 configured to capture an image; and a communication interface 104 configured to enable the memory 101 and the processor 102 to communicate with an external device.

The memory 101 may include a high-speed RAM memory, or may also include a non-volatile memory, such as at least one disk memory.

Figure 5:
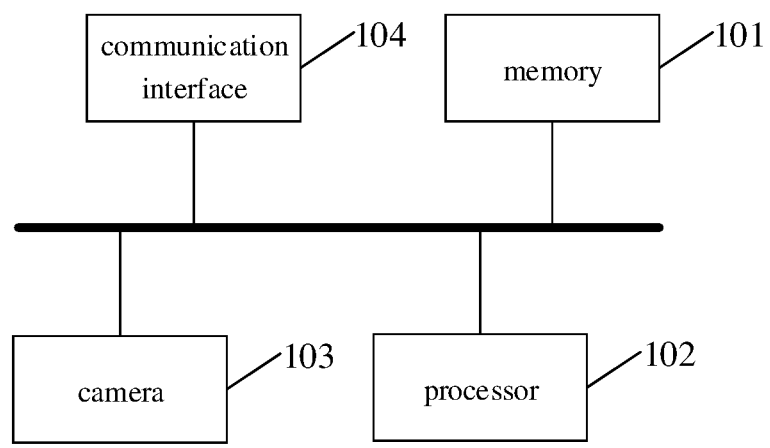
FIG. 5 is a schematic structural diagram of a terminal for identity authentication according to an embodiment of the present disclosure.

If the memory 101, the processor 102, the camera 103 and the communication interface 104 are implemented independently, the memory 101, the processor 102, the camera 103 and the communication interface 104 may be connected to one another via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus and so on. For ease of illustration, only one bold line is shown in FIG. 5 to represent the bus, but it does not mean that there is only one bus or only one type of bus.

Optionally, in a specific implementation, if the memory 101, the processor 102, the camera 103 and the communication interface 104 are integrated on one chip, then the memory 101, the processor 102, the camera 103 and the communication interface 104 can complete mutual communication through an internal interface.

Fourth Embodiment

A non-volatile computer readable storage medium is provided according to an embodiment of the present disclosure, wherein a computer program is stored on the storage medium, and the computer program, when executed by a processor, implements the method for identity authentication as described in any of the above embodiments.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowchart or described otherwise herein may be construed as representing a module, segment or portion including codes of one or more executable instructions for implementing a particular logical function or process step. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the present specification, "computer-readable medium" can be any means that can contain, store, communicate, propagate or transmit programs for use by an instruction execution system, apparatus or device or for use in conjunction with the instruction execution system, apparatus or device.

The computer-readable medium described in the embodiments of the disclosure may a computer-readable signal medium or a computer-readable storage medium or any combination of a computer-readable signal medium and a computer-readable storage medium. More specific examples (non-exhaustive list) of computer-readable storage medium at least include: an electrical connection part (an electronic device) having one or more wires, a portable computer disk cartridge (a magnetic device), a random access memory (RAM), a read only memory (ROM), an erasable programmable read-only memory (EPROM or flash memory), a fiber optic device, and a portable read-only memory (CDROM). In addition, the computer-readable storage medium may even be a paper or other suitable medium on which the program can be printed, for example, because the program is obtained electronically by optically scanning the paper or other medium, followed by editing, interpretation or, if necessary, in another suitable way of processing, and then is stored in a computer memory.

In an embodiment of the disclosure, the computer-readable signal medium may include a data signal propagating in a baseband or as a part of a carrier, in which computer-readable program codes are carried. Such propagating data signal can take a variety of forms including, but not limited to, an electromagnetic signal, optical signal, or any suitable combination of the electromagnetic signal and optical signal. The computer-readable signal medium may also be any computer-readable medium other than a computer-readable storage medium, and the computer-readable medium can send, propagate or transmit a program for use by an instruction execution system, an input method, or a device or for use in conjunction with the instruction execution system, the input method, or the device. The program codes embodied in the computer-readable medium can be transmitted by any suitable medium, including but not limited to: wireless, wire, optic cable, radio frequency (RF), etc., or any suitable combination of the foregoing.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: a discrete logic circuit having a logic gate circuit for implementing a logic function on a data signal, an application-specific integrated circuit having a suitable combined logic gate circuit, a programmable gate array (PGA), a field programmable gate array (FPGA), etc.

Those skilled in the art may understand that all or some of the steps carried in the method of the foregoing embodiments may be implemented by using a program to instruct the relevant hardware, and the program may be stored in a computer-readable storage medium. When executed, the program includes one or a combination of the steps in the method embodiments.

In addition, individual functional units in each of various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be subject to the scope of the appended claims.

What is claimed is:

1. A method for identity authentication, comprising:
   acquiring a human body image of a person to be authenticated, and determining from the human body image a plurality of skeleton key points of the person to be authenticated;
   converting the skeleton key points into feature data, and combining the feature data to form physique feature information characterizing the person to be authenticated;
   processing the physique feature information using a physique feature model by inputting the physique feature information into the physique feature model, to obtain a processing result; and
   recognizing the identity of the person to be authenticated based on the processing result of the physique feature model,
   wherein said converting the skeleton key points into feature data comprises:
   defining a plurality of feature points based on the human body image, each of the feature points having a function; and
   for each of the feature points, performing operations on all the skeleton key points according to the function of the feature point, and summing up the results of the operations performed on all the skeleton key points according to the function, to obtain one of the feature data corresponding to the feature point.

2. The method according to claim 1, wherein said determining from the human body image a plurality of skeleton key points of the person to be authenticated comprises:
   extracting the plurality of skeleton key points of the person to be authenticated from the human body image of the person to be authenticated, based on a skeleton recognition model constructed by a convolutional neural network.

3. The method according to claim 2, further comprising constructing the skeleton recognition model, wherein the constructing the skeleton recognition model comprises:
   labeling sample skeleton key points of a plurality of sample human body images, and constructing a basic model based on the sample skeleton key points of the plurality of sample human body images; and
   training the basic model with a plurality of training samples to generate the skeleton recognition model for recognizing the skeleton key points.

4. The method according to claim 1, wherein before converting the skeleton key points into feature data, the method further comprises:
   converting the skeleton key points determined in a non-standard posture of the person to be authenticated, into the standard skeleton key points in a standard posture of the person to be authenticated.

5. The method according to claim 1, wherein the physique feature model comprises a first physique feature model and/or a second physique feature model;
   the first physique feature model is configured to determine a probability that the person to be authenticated is a suspected person, and
   the second physique feature model is configured to determine a probability that the person to be authenticated is one of multiple persons.

6. The method according to claim 1, further comprising constructing the physique feature model, wherein the constructing the physique feature model comprises:
   converting sample skeleton key points of a sample human body image into sample feature data; and
   constructing the physique feature model based on a fully connected network structure or a residual network structure in combination with the sample feature data.

7. The method according to claim 6, wherein the sample skeleton key points are standard sample skeleton key points under a standard posture.

8. A system for identity authentication, comprising:
   one or more processors; and
   a storage device configured to store one or more programs, wherein
   the one or more programs, when executed by the one or more processors, enable the one or more processors to:
   acquire a human body image of a person to be authenticated, and determine from the human body image a plurality of skeleton key points of the person to be authenticated;
   convert the skeleton key points into feature data, and combine the feature data to form physique feature information characterizing the person to be authenticated;
   process the physique feature information using a physique feature model by inputting the physique feature information into the physique feature model, to obtain a processing result; and
   recognize the identity of the person to be authenticated based on the processing result of the physique feature model,
   wherein the one or more programs, when executed by the one or more processors, enable the one or more processors further to:
   define a plurality of feature points based on the human body image, each of the feature points having a function; and
   for each of feature points, performing operations on all the skeleton key points according to the function of the feature point, and summing up the results of the operations performed on all the skeleton key points according to the function, to obtain one of the feature data corresponding to the feature point.

9. The system according to claim 8, wherein the one or more programs, when executed by the one or more processors, enable the one or more processors further to:
    extract the plurality of skeleton key points of the person to be authenticated from the human body image of the person to be authenticated, based on a skeleton recognition model constructed by a convolutional neural network.

10. The system according to claim 8, wherein the one or more programs, when executed by the one or more processors, enable the one or more processors further to:
    convert the skeleton key points determined in a non-standard posture of the person to be authenticated, into the standard skeleton key points in a standard posture of the person to be authenticated.

11. A non-transitory computer readable storage medium, in which a computer program is stored, wherein the computer program, when executed by a processor, implements the method according to claim 1.

* * * * *